E. L. BEATY.
POWER SHOVEL.
APPLICATION FILED APR. 18, 1919.
1,320,970.
Patented Nov. 4, 1919.
2 SHEETS—SHEET 2.
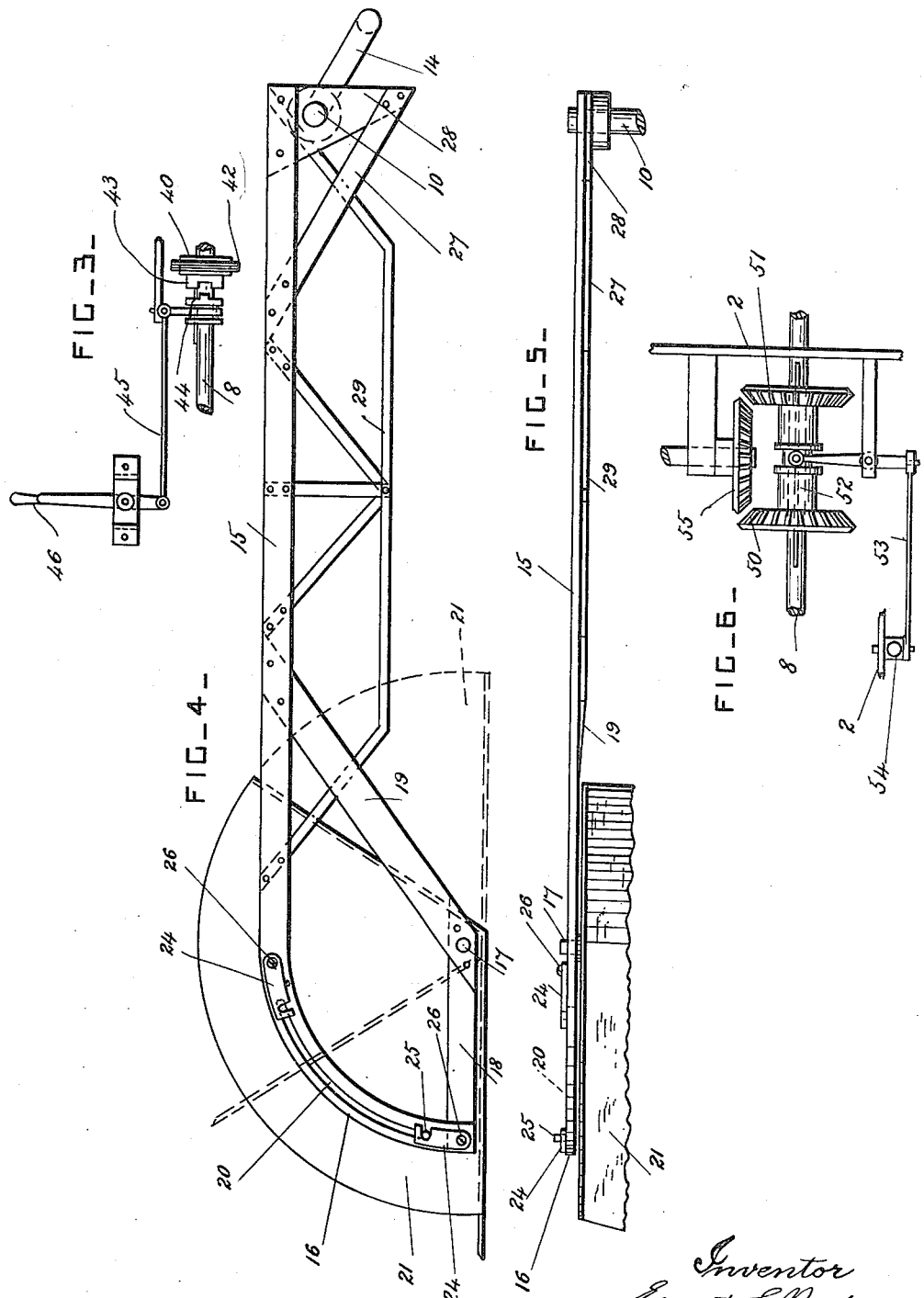

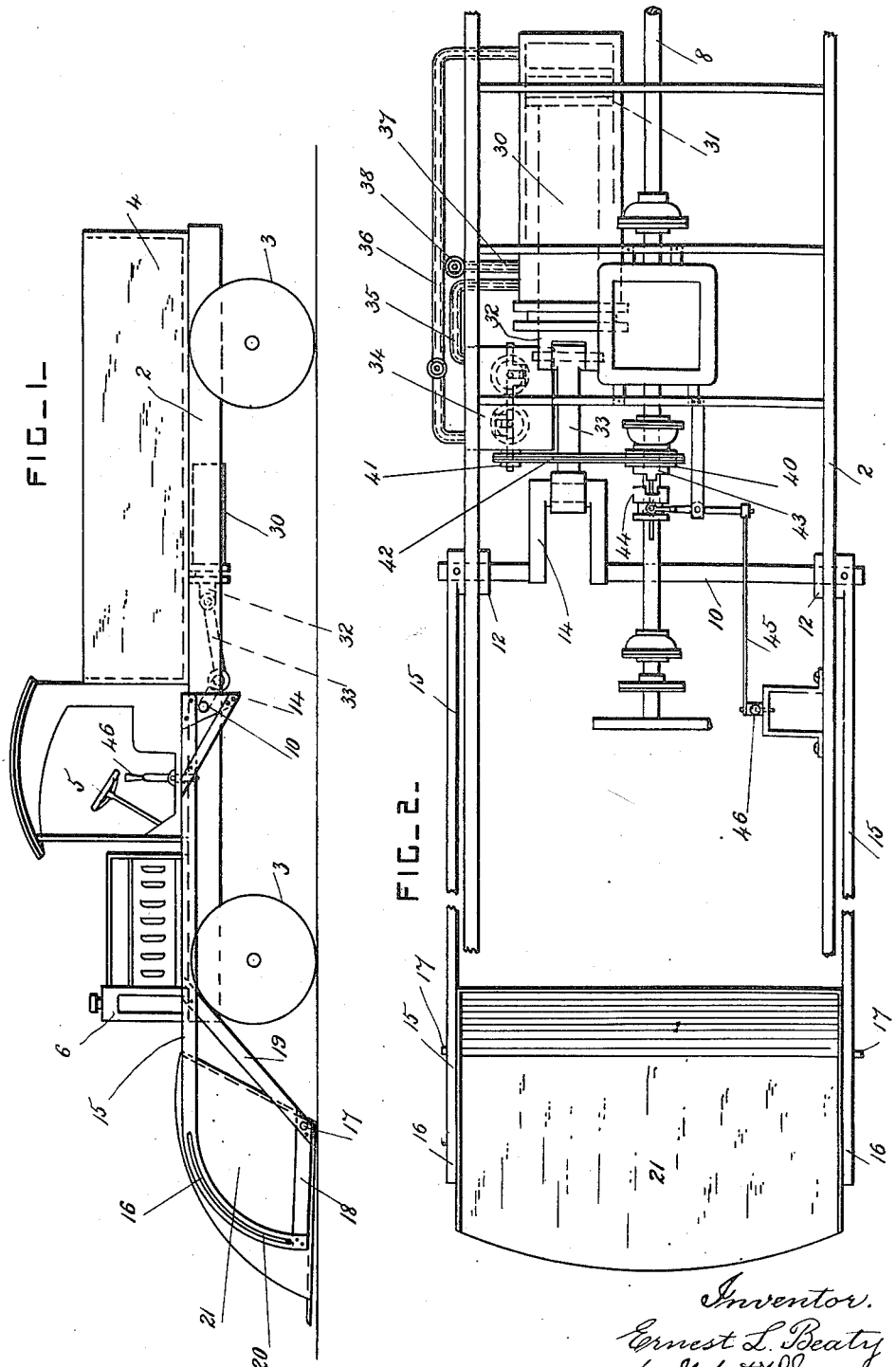

UNITED STATES PATENT OFFICE.

ERNEST L. BEATY, OF STATESVILLE, NORTH CAROLINA, ASSIGNOR OF ONE-HALF TO CAROLINA MOTOR COMPANY, OF STATESVILLE, NORTH CAROLINA, A COMPANY OF NORTH CAROLINA.

POWER-SHOVEL.

1,320,970. Specification of Letters Patent. Patented Nov. 4, 1919.

Application filed April 18, 1919. Serial No. 291,011.

*To all whom it may concern:*

Be it known that I, ERNEST L. BEATY, a citizen of the United States, residing at Statesville, in the county of Iredell and State of North Carolina, have invented certain new and useful Improvements in Power-Shovels, of which the following is a specification.

This invention relates to power shovels adapted for use in road making and for shoveling top soil and loading it into automobile trucks; and it consists principally in the novel construction of the devices for operating the shovel by means of a hydraulic cylinder as hereinafter fully described and claimed.

In the drawings, Figure 1 is a side view of an automobile truck provided with a power shovel according to this invention. Fig. 2 is a plan view of the hydraulic mechanism and its connection drawn to a larger scale. Fig. 3 is a side view of the clutch shifting mechanism, shown in Fig. 2, and some other parts. Fig. 4 is a detail side view of the shovel and its operating arms. Fig. 5 is a plan view of a portion of the same. Fig. 6 is a plan view of a modification of the driving devices for the pump, showing the use of reversing mechanism and beveled toothed wheels.

The automobile truck frame 2 is mounted on ground wheels 3, and is provided at its rear part with a receptacle or hopper 4 for soil. The seat for the driver and the hand steering wheel 5 are preferably arranged in front of this receptacle, and the radiator 6 is arranged at the front end of the machine. The automobile truck is provided with a motor (not shown) of any approved construction for driving it, and an internal combustion engine is preferably used. The main driving shaft 8 of the motor is preferably arranged longitudinally at the middle part of the frame, and is connected with the rear road wheels in any approved way.

A strong crankshaft 10 is journaled in bearings 12 at the middle part of the frame, and is provided with a crank 14. Arms 15 for supporting the shovel are secured on the ends of the crankshaft outside the frame, and extend longitudinally beyond the front end of the frame. These arms have downwardly curved front end portions 16, arranged concentric with the shovel pivots or shaft 17. These pivots or shaft are supported by inclined bars 18 and 19 secured together at one end and arranged at an obtuse angle to each other. The outer end portions of these bars 18 and 19 are secured to the free ends of the curved parts and to the arms 15. The curved parts are provided with concentric curved slots 20.

The shovel 21 is mounted pivotally on the pivots or shaft 17, and is provided with laterally projecting pins 25 which engage with the curved slots 20. Latches 24 are pivoted to the arms at the ends of the curved slots by pins 26, and they have notches which engage with the pins 25, and lock the shovel to the arms at the ends of its pivotal movements. The shovel arms have inclined braces 27 at their rear ends which brace the plates 28 which are secured to the crankshaft. The arms are also provided with truss braces 29 of approved construction which make them very strong and rigid. The shovel can be tilted to the position shown in the dotted lines when not in use, or for the purpose of discharging its contents with greater facility.

The arms of the crank 14 are arranged at an angle to the arms 15 of the shovel, and so that they project downwardly and rearwardly when the arms of the shovel are horizontal.

A hydraulic cylinder 30 is secured to the frame in a horizontal position, and is provided with a piston 31, a piston-rod 32, and a connecting-rod 33 between the piston-rod and the crank-pin of the crank 14. A suitable force pump or pumps of any approved construction is provided and is inclosed in a casing 34 secured to the frame, and this pump is operatively connected with the ends of the cylinder by pipes 35 and 36 provided with suitable suction and delivery valves. A by-pass 37 is provided and has a valve 38 so that the liquid can be admitted from one end of the cylinder to the other without being pumped. Oil is preferably used as the fluid in the cylinder, but other fluids may be used if desired. The pump is driven from the driving shaft 8 of the motor by any approved intermediate driving mechanism. In the arrangement shown in Fig. 2, a sprocket wheel 40 is mounted loosely on the shaft 8, and drives a sprocket wheel 41 on the pump shaft by means of a drive chain 42, or other similar flexible connection.

The sprocket wheel 40 is provided with a clutch member 43, and 44 is a slidable clutch member splined to the shaft 8, and engaging with the clutch member 43 so as to drive the pump and supply fluid to the rear end of the cylinder to force the piston outwardly and raise the shovel by operating the crank and the shovel arms.

The motor truck is driven forwardly on its ground wheels with the shovel engaging with the ground until sufficient soil has been collected in the shovel. The road wheels are then unclutched and the clutch is operated to start the pump and raise the shovel so that its contents are discharged into the receptacle.

The shovel descends by gravity in this arrangement, but it may be moved back to its first position positively if desired. The clutch has a rod 45 and an operating lever 46 connected to it so that it may be operated conveniently from the seat of the driver.

In the driving devices shown in Fig. 6, beveled toothed wheels 50 and 51 are secured on a sleeve 52 which is splined to the shaft 8, and provided with a rod 53 and a lever 54 for sliding the sleeve and wheels longitudinally. The wheels 50 and 51 can be placed alternately in gear with a beveled toothed wheel 55 secured on the pump shaft, so that the shovel can be raised and lowered positively by means of the pump which is then provided with suitable suction and delivery valves so that it will pump into one end or the other of the cylinder according to the direction in which it is driven.

The shovel can also be permitted to descend by gravity by placing both wheels 50 and 51 out of gear with the wheel 55, and opening the by-pass valve.

What I claim is:

1. The combination, with a motor car, of a crankshaft journaled in the car frame and provided with a crank, arms secured to the end portions of the crankshaft outside the car frame, a shovel carried by the free end portions of the said arms, a hydraulic cylinder secured to the car frame and operatively connected with the said crank, and means for operating the said cylinder from the motor of the car.

2. The combination, with a motor car, of a crankshaft journaled in the car frame and provided with a crank, arms secured to the end portions of the crankshaft outside the car frame, a tiltable shovel pivoted between the free end portions of the said arms, a receptacle for soil arranged at the rear of the motor car and adapted to receive the contents of the shovel when same is raised and tilted, a hydraulic cylinder secured to the car frame and operatively connected with the said crank, and means for operating the said cylinder from the motor of the car.

3. The combination, with a motor car, of a crankshaft journaled in the car frame and provided with a crank, arms secured to the end portions of the crankshaft outside the car frame, a shovel carried by the free end portions of the said arms, a hydraulic cylinder secured to the car frame and operatively connected with the said crank, a pump operatively connected with the said cylinder, a driving wheel mounted on the driving shaft of the car motor, intermediate driving devices operatively connecting the said driving wheel with the pump, and clutch mechanism for placing the said pump into and out of operative connection with the said driving shaft.

4. The combination, with a motor car, of a crankshaft journaled in the car frame and provided with a crank, arms secured to the end portions of the crankshaft outside the car frame, a shovel carried by the free end portions of the said arms, a hydraulic cylinder secured to the car frame and operatively connected with the said crank, a pump operatively connected with the said cylinder, driving mechanism actuated by the motor of the car and operatively connected with the said pump, and reversing devices connected with the said driving mechanism and permitting the pump to force fluid into each end of the cylinder at will.

5. The combination, with a motor car, of arms having their rear ends pivoted to the car frame and arranged outside it and having downwardly curved portions at their free ends provided with curved slots, bars arranged at an angle to each other and having their outer ends secured to the said arms and the end portions of their curved parts, and a shovel pivoted to the meeting portions of the said bars concentric with the curved slots and provided with pins which work in the said slots and limit the pivotal movements of the shovel.

6. The combination, with a motor car, of a crankshaft journaled in the car frame and provided with a crank, arms secured to the end portions of the crankshaft outside the car frame, said arms being arranged at an angle to the crank so that the crank projects downwardly and rearwardly when the said arms are horizontal, a shovel carried by the free end portions of the said arms, a hydraulic cylinder arranged in a horizontal position and secured to the car frame and operatively connected with the said crank, and means for operating the said cylinder from the motor of the car.

In testimony whereof I have affixed my signature.

ERNEST L. BEATY.